United States Patent
Malapati et al.

(10) Patent No.: US 10,864,884 B2
(45) Date of Patent: Dec. 15, 2020

(54) ADAPTIVE KNEE AIRBAG

(71) Applicant: Ford Global Technologies, LLC, Dearborn, MI (US)

(72) Inventors: Srinivas Reddy Malapati, Novi, MI (US); Mangesh Kadam, Canton, MI (US); Yuqin Zhao, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 90 days.

(21) Appl. No.: 16/263,575

(22) Filed: Jan. 31, 2019

(65) Prior Publication Data

US 2020/0247349 A1  Aug. 6, 2020

(51) Int. Cl.
| | |
|---|---|
| *B60R 21/239* | (2006.01) |
| *B60R 21/045* | (2006.01) |
| *B60R 21/206* | (2011.01) |
| *B60R 21/2338* | (2011.01) |
| *B60R 21/02* | (2006.01) |
| *B60R 21/00* | (2006.01) |
| *B60R 21/233* | (2006.01) |
| *B60R 21/231* | (2011.01) |

(52) U.S. Cl.
CPC .......... *B60R 21/239* (2013.01); *B60R 21/045* (2013.01); *B60R 21/206* (2013.01); *B60R 21/2338* (2013.01); *B60R 21/233* (2013.01); *B60R 2021/0051* (2013.01); *B60R 2021/024* (2013.01); *B60R 2021/23169* (2013.01); *B60R 2021/23382* (2013.01)

(58) Field of Classification Search
CPC . B60R 21/239; B60R 21/2338; B60R 21/045; B60R 21/206; B60R 2021/23382; B60R 2021/024; B60R 2021/23169; B60R 21/233; B60R 2021/0051
See application file for complete search history.

(56) References Cited

U.S. PATENT DOCUMENTS

| | | | |
|---|---|---|---|
| 3,784,223 A | * | 1/1974 | Hass ................... B60R 21/2032 280/730.1 |
| 4,262,931 A | | 4/1981 | Strasser et al. |
| 5,941,559 A | * | 8/1999 | Rudolf ................. B60R 21/233 280/729 |
| 7,063,350 B2 | | 6/2006 | Steimke et al. |
| 7,278,656 B1 | * | 10/2007 | Kalandek .............. B60R 21/207 280/729 |
| 8,596,678 B2 | | 12/2013 | Ravenberg et al. |
| 9,108,587 B2 | | 8/2015 | Rickenbach et al. |
| 9,132,797 B2 | | 9/2015 | Abramoski et al. |
| 9,272,681 B1 | | 3/2016 | Enders |

(Continued)

FOREIGN PATENT DOCUMENTS

DE   10355764 B3   5/2005

*Primary Examiner* — Drew J Brown
(74) *Attorney, Agent, or Firm* — Frank A. MacKenzie; Bejin Bieneman PLC

(57) ABSTRACT

An instrument panel assembly includes an instrument panel. The instrument panel assembly includes an airbag having an inboard chamber and an outboard chamber. A panel separates the inboard chamber and the outboard chamber. A diffuser is in fluid communication with both the inboard chamber and the outboard chamber. A releasable vent is between the diffuser and one of the inboard chamber and the outboard chamber. An inflator is in fluid communication with the diffuser.

20 Claims, 9 Drawing Sheets

(56) References Cited

U.S. PATENT DOCUMENTS

| | | |
|---|---|---|
| 9,469,270 B2 | 10/2016 | Abe |
| 9,580,040 B2 | 2/2017 | Komatsu et al. |
| 9,663,058 B1 | 5/2017 | Whitens et al. |
| 2005/0127648 A1* | 6/2005 | Fischer ............... B60R 21/2338 280/739 |
| 2006/0103119 A1* | 5/2006 | Kurimoto ............. B60R 21/233 280/730.2 |
| 2007/0152435 A1* | 7/2007 | Jamison .............. B60R 21/2338 280/743.2 |
| 2008/0122205 A1* | 5/2008 | Imamura ............... B60R 21/203 280/730.1 |
| 2009/0033081 A1* | 2/2009 | Flischer .............. B60R 21/2338 280/743.2 |
| 2015/0097359 A1* | 4/2015 | Rickenbach ...... B60R 21/23138 280/729 |
| 2019/0047504 A1* | 2/2019 | Sugishima ............ B60R 21/207 |

* cited by examiner

ADAPTIVE KNEE AIRBAG

BACKGROUND

Vehicles are subject to impact testing for different types of frontal collisions. In one example, a test procedure simulates an impact of a test vehicle from another vehicle at an oblique angle. The test procedure provides that a moving deformable barrier impacts the test vehicle with a speed of 56 miles per hour (mph) with a 35% overlap from a center of a front of the test vehicle and at an angle of 15° from a vehicle-forward direction. This test has been proposed by the National Highway Traffic Safety Administration (NHTSA) for inclusion in the United States New Car Assessment Program (US-NCAP).

DETAILED DESCRIPTION

Figure 1:
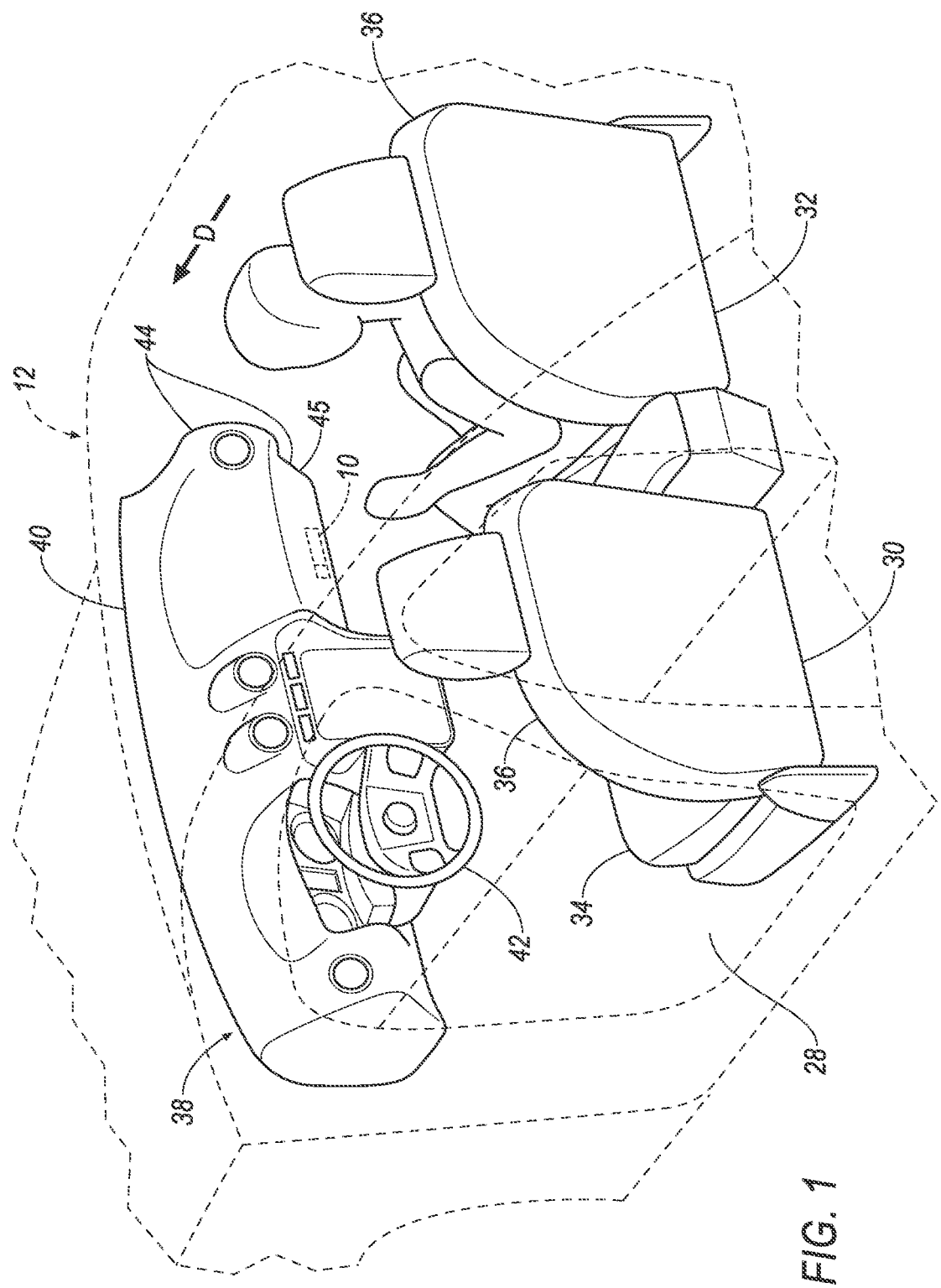
FIG. 1 is a perspective view of a passenger cabin in a vehicle.

An instrument panel assembly includes an instrument panel. The instrument panel assembly includes an airbag having an inboard chamber and an outboard chamber. A panel separates the inboard chamber and the outboard chamber. A diffuser is in fluid communication with both the inboard chamber and the outboard chamber. A releasable vent is between the diffuser and one of the inboard chamber and the outboard chamber. An inflator is in fluid communication with the diffuser.

The diffuser may extend through the panel.

The panel may separate the inboard chamber and the outboard chamber horizontally.

The panel may fluidly separate the inboard chamber and the outboard chamber.

The panel may be permeable.

An airbag assembly includes an airbag having an inboard chamber and an outboard chamber. The airbag assembly includes a panel separating the inboard chamber and the outboard chamber. The airbag assembly includes a diffuser in fluid communication with both the inboard chamber and the outboard chamber. The airbag assembly includes a releasable vent between the diffuser and one of the inboard chamber and the outboard chamber. The airbag assembly includes an inflator in fluid communication with the diffuser.

The diffuser may extend through the panel.

The panel may separate the inboard chamber and the outboard chamber horizontally.

The panel may fluidly separate the inboard chamber and the outboard chamber.

The panel may be permeable.

The airbag assembly may include a one-way valve on the panel and in fluid communication with the inboard chamber and the outboard chamber.

The airbag assembly may include a pyrotechnic release connected to the releasable vent.

The airbag assembly may include a controller programmed to actuate the pyrotechnic release in response to an angular impact.

The diffuser may include an inboard vent in fluid communication with the inboard chamber, an outboard vent in fluid communication with the outboard chamber, and the releasable vent is spaced from the inboard vent and the outboard vent.

The diffuser may include an inboard vent in fluid communication with the inboard chamber, an outboard vent in fluid communication with the outboard chamber, and the releasable vent is designed to expand a cross-sectional area of one of the inboard vent and the outboard vent.

The diffuser may include an inboard vent in fluid communication with the inboard chamber and an outboard vent in fluid communication with the outboard chamber, wherein the inboard vent, the outboard vent, and the releasable vent are sized to inflate the inboard chamber and the outboard chamber to same pressure.

The diffuser may include an inboard vent in fluid communication with the inboard chamber and an outboard vent in fluid communication with the outboard chamber, wherein the inboard vent, the outboard vent, and the releasable vent are sized to inflate the inboard chamber and the outboard chamber to different pressures.

The diffuser may include an inboard vent in fluid communication with the inboard chamber, an outboard vent in fluid communication with the outboard chamber, the releasable vent is in communication with the inboard chamber, and the inboard vent, the outboard vent, and the releasable vent are sized to inflate the inboard chamber to a greater pressure than the outboard chamber.

The airbag assembly may include a releasable tether connected to a front surface and a rear surface of the airbag.

The releasable tether may include tack stitching, and the tack stitching is designed to rupture.

With reference to the Figures, wherein like numerals designate like parts throughout the several views, an airbag assembly 10 for a vehicle 12 includes an airbag 14 having an inboard chamber 16 and an outboard chamber 18. The airbag assembly 10 includes a panel 20 separating the inboard chamber 16 and the outboard chamber 18. The airbag assembly 10 includes a diffuser 22 in fluid communication with both the inboard chamber 16 and the outboard chamber 18. The airbag assembly 10 includes a releasable vent 24 between the diffuser 22 and one of the inboard chamber 16 and the outboard chamber 18. The airbag assembly 10 includes an inflator 26 in fluid communication with the diffuser 22.

The releasable vent 24 allows one of the chambers to inflate more than the other chamber. For example, the releasable vent 24 may allow the chamber that is closer to the side of the oblique impact (e.g., the inboard chamber 16 in FIG. 3) to inflate more than the chamber farther away from the side of the oblique impact (e.g., outboard chamber 18 in FIG. 3). In other words, the airbag 14 is adaptive to allow the chamber closer to the side of impact to inflate more than the chamber father away from the side of the impact. This can control the kinematics of an occupant by resisting travel of the knees across the airbag 14 toward the direction of the impact to urge the body of the occupant to remain in an upright position.

With reference to FIG. 1, the vehicle 12 includes a passenger cabin 28 to house occupants, if any, of the vehicle 12. The vehicle 12 may be, for example, an automobile such as a car, truck, sport-utility vehicle (SUV), wagon, etc.

The passenger cabin 28 includes seats, which may include a front driver seat 30 and a front passenger seat 32 disposed at a front of the passenger cabin 28 and one or more back seats (not shown) disposed behind the front seats 30, 32. The passenger cabin 28 may also include third-row seats (not shown) at a rear of the passenger cabin 28. In FIG. 1, the front seats 30, 32 are shown as bucket seats, but the front seats 30, 32 may be other types, such as bench seats. Each of the front seats 30, 32 may include a seat bottom 34 and a seatback 36. The position and orientation of the front seats 30, 32 and components thereof may be adjustable by an occupant.

Figure 2:
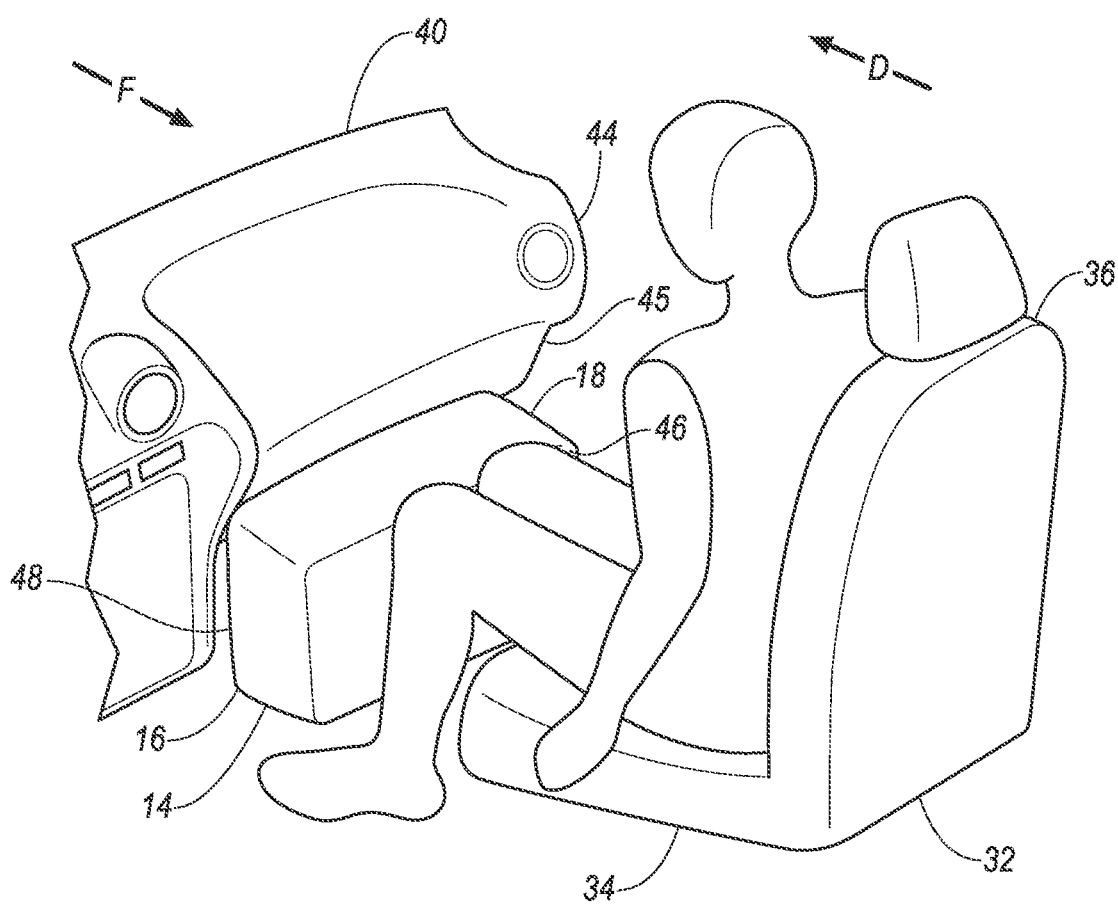
FIG. 2 is a perspective view of a portion of the passenger cabin with an airbag inflated in response to a full-frontal impact.
Figure 3:
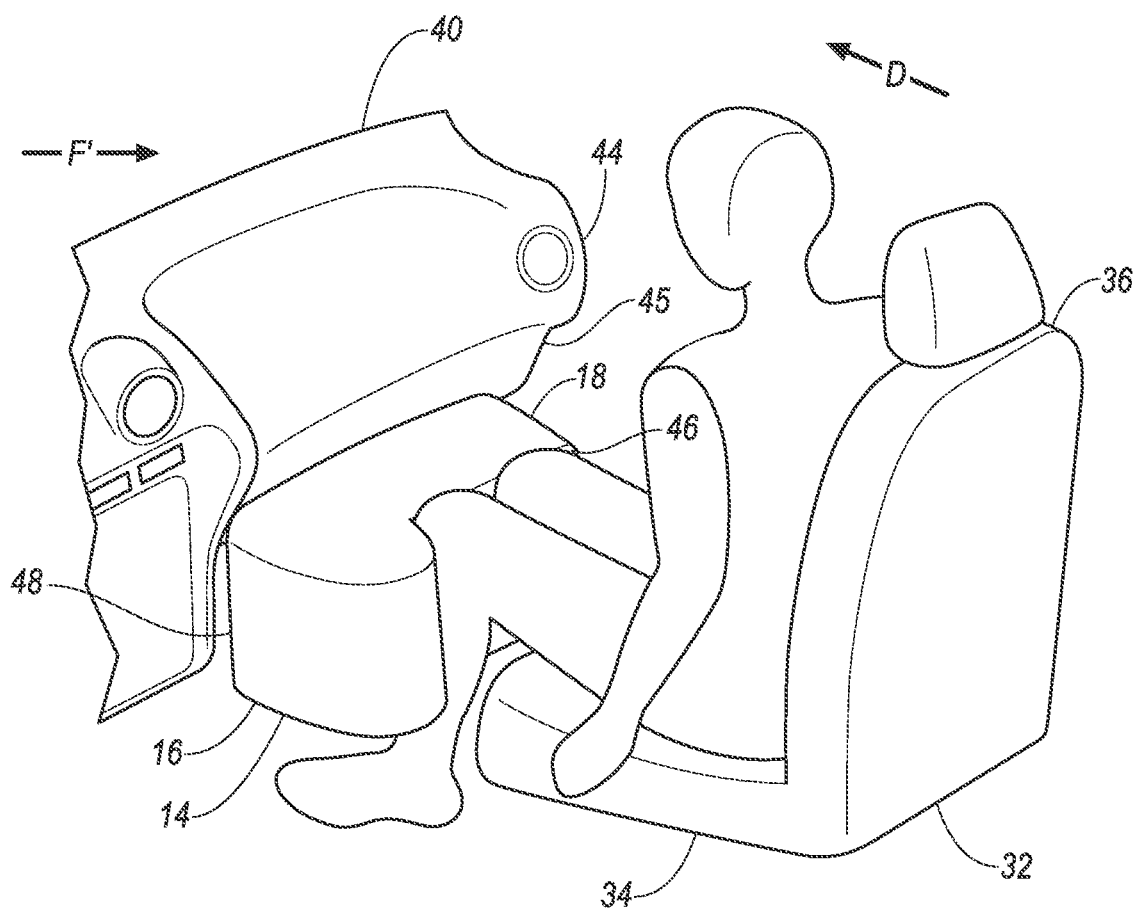
FIG. 3 is a perspective view of a portion of the passenger cabin with the airbag inflated in response to a front angular impact.

With reference to FIGS. 1-3, the vehicle 12 includes an instrument panel assembly 38. The instrument panel assembly 38 includes an instrument panel 40 and the airbag assembly 10.

The instrument panel 40 is disposed at a forward end of the passenger cabin 28 and faces toward the front seats 30, 32. The instrument panel 40 may include vehicle controls, such as a steering wheel 42, gauges, dials, information displays, heating and ventilation equipment, a radio and other electronics, etc.

The instrument panel 40 may include exterior panels 44. The exterior panels 44 may be directed in various directions; for example, one or more of the exterior panels 44 on a top of the instrument panel 40 may be disposed upward and rearward, e.g., toward a ceiling and toward the front seats 30, 32, and one or more of the exterior panels 44 on a bottom of the instrument panel 40 may be disposed downward and rearward, e.g., toward a floor and toward the front seats 30, 32. The front seats 30, 32 may face the instrument panel 40. As one example, the exterior panels 44 include a lower panel 45. The lower panel 45 is "directed downwardly," meaning that the lower panel 45 faces at least partially downward, e.g., toward a floor of the passenger cabin 28. The lower panel 45 may be a single panel, may include multiple segments, and/or may include a portion of a segment.

The airbag assembly 10 is supported by the instrument panel 40. For example, the airbag assembly 10 may include a housing (not numbered) that may be fastened to the instrument panel 40. In such an example, the airbag 14 may be housed in the housing prior to inflation and supported by the housing during and after inflation.

The airbag assembly 10 may be, for example, positioned to be a knee airbag assembly, i.e., the airbag 14 is positioned to interact with knees of an occupant when inflated. In such an example, the airbag assembly 10 may be disposed at a lower portion of the instrument panel 40. The airbag assembly 10 may be concealed by the lower panel 45, i.e., may be disposed vehicle-forward of the lower panel 45. The airbag assembly 10 may be aligned in a vehicle-forward direction D with the seat bottom 34 of the front passenger seat 32.

The airbag 14 is inflatable from an uninflated position, as shown in FIG. 1, to an inflated position, as shown in FIGS. 2-8C. The airbag 14 is coupled to the instrument panel 40, for example, by the housing of the airbag assembly 10. The airbag 14 in the uninflated position may be disposed in the airbag assembly 10 and concealed by the lower panel 45. The airbag 14 in the inflated position is disposed in front of the seat bottom 34 of the front passenger seat 32. The airbag 14 may be positioned to contact knees of an occupant, e.g., a $5^{th}$ percentile to $95^{th}$ percentile occupant, of the front passenger seat 32 when the airbag 14 is inflated.

The inboard chamber 16 and the outboard chamber 18 of the airbag 14 may be inflatable to respective pressures based on the direction of vehicle impact. One example is shown in FIG. 2 in which the vehicle 12 is impacted with impact force F and another example is shown in FIG. 3 in which the vehicle 12 is impacted with impact force F'.

For example, as shown in FIG. 2, the airbag 14 is inflatable with the inboard chamber 16 and the outboard chamber 18 at a common pressure in response to a full-frontal impact. For example, impact force F represents a full-frontal impact, i.e., the impact force F may be parallel to a longitudinal centerline of the vehicle 12 and face a vehicle-rearward direction.

As another example, as shown in FIG. 3, the chamber of the airbag 14 closer to the side of the angular impact (e.g., the inboard chamber 16 in the example in FIG. 3) is inflated to a greater pressure than the chamber that is farther away from the side of the angular impact (e.g., the outboard chamber 18 in the example in FIG. 3) when the airbag 14 is inflated in response to an angular impact. For example, impact force F' represents an angular impact, such as an oblique impact. Other examples of an angular impact include small offset rigid barrier (SORB), offset deformable barrier (ODB), etc. The impact force F' may be at an angle from a longitudinal centerline of the vehicle 12 and face a vehicle-rearward direction. A left oblique impact is an impact at an angle offset from the longitudinal centerline to the left, and a right oblique impact is an impact at an angle offset from the longitudinal centerline to the right. During the right oblique impact, the outboard chamber 18 may be inflated to a greater pressure than the inboard chamber 16. As described above, the inflation of the chamber that is closer to the side of the angular impact can control the kinematics of the occupant by resisting travel of the knees across the airbag 14 toward the direction of the impact to urge the body of the occupant to remain in an upright position.

Figure 4:
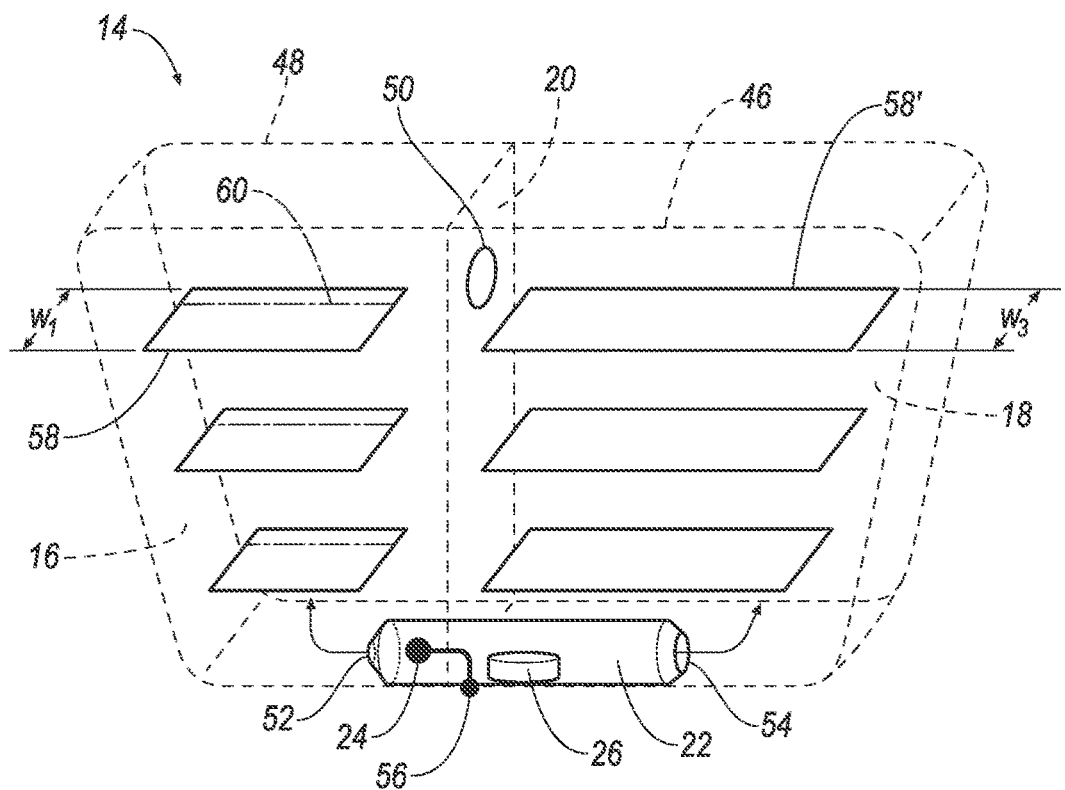
FIG. 4 is a perspective view of the airbag with two chambers that are inflated to a common pressure.
Figure 5:
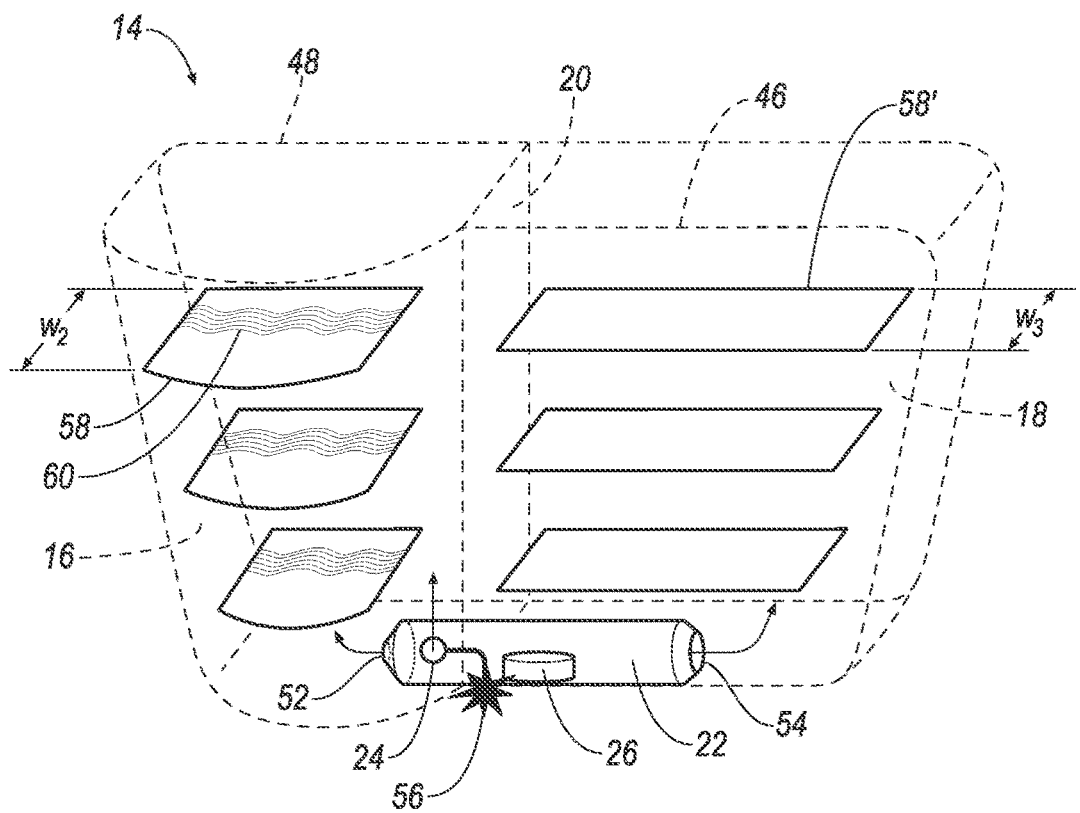
FIG. 5 is a perspective view of the airbag with one chamber inflated to a greater pressure than the other chamber.

With reference to FIGS. 4 and 5, the airbag 14 has a rear surface 46 and a front surface 48. The airbag 14 may be any suitable airbag material, for example, a woven polymer. For example, the airbag 14 may be woven nylon yarn, such as nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The rear surface 46 may face away from the instrument panel 40 when the airbag 14 is inflated (e.g., is in the inflated position). The rear surface 46 may face in a vehicle-rearward direction and/or a vehicle-downward direction when the airbag 14 is in the inflated position. The front surface 48 may face toward the instrument panel 40 when the airbag 14 is inflated (e.g., is in the inflated position). The front surface 48 may face in the vehicle-forward direction D and/or a vehicle-upward direction when the airbag 14 is in the inflated position. The rear surface 46 and the front surface 48 may be approximately (i.e., accounting for the bulbous nature of an airbag) parallel to each other when the airbag 14 is in the inflated position. The rear surface 46 and the front surface 48 may be fixed to each other, e.g., via stitching, adhesive, friction welding, etc. The rear surface 46 and the front surface 48 may be monolithic (e.g., the same sheet of material). Alternatively, the rear surface 46 and the front surface 48 may be multiple sheets of material.

The airbag 14 includes the panel 20 separating the inboard chamber 16 and the outboard chamber 18, i.e., the panel 20 divides the inboard chamber 16 and the outboard chamber 18 and limits or prevents fluid flow therebetween. In one example, the panel 20 may fluidly separate the inboard chamber 16 and the outboard chamber 18 to prevent fluid flow therebetween. For example, the panel 20 may be coated with any suitable material (e.g., silicone, neoprene, urethane, etc.) to prevent fluid flow from the outboard chamber 18 to the inboard chamber 16, and vice versa. In another example, the panel 20 may be permeable, i.e., to restrict and not prevent fluid flow between the inboard chamber 16 and the outboard chamber 18. For example, the panel 20 may be any suitable material uncoated and/or porous that may allow fluid flow from one chamber to the other chamber or between the chambers 16, 18. In yet another example, the panel 20 may include a one-way valve 50 in fluid communication with the inboard chamber 16 and the outboard chamber 18. The one-way valve 50 may be positioned at any suitable location on the panel 20. The one-way valve 50 may allow fluid flow from one chamber to the other chamber. For example, the one-way valve 50 may allow fluid flow from the outboard chamber 18 to the inboard chamber 16, or vice versa.

The panel 20 may separate the inboard chamber 16 and the outboard chamber 18 horizontally, that is, in a cross-vehicle direction. The panel 20 may be in a vehicle fore-and-aft plane.

The inboard chamber 16 may be disposed in the vehicle-forward direction D from a left knee of an occupant of the front passenger seat 32 when the airbag 14 is in the inflated position. Similarly, the outboard chamber 18 may be disposed in the vehicle-forward direction D from a right knee of an occupant of the front passenger seat 32 when the airbag 14 is in the inflated position.

The airbag 14 includes the diffuser 22 in communication with both the inboard chamber 16 and the outboard chamber 18. The diffuser 22 provides inflation gas to the inboard chamber 16 and the outboard chamber 18. The diffuser 22 may be elongated horizontally. For example, the diffuser 22 may be elongated in a cross-vehicle direction.

The diffuser 22 may extend through the panel 20, i.e., the diffuser 22 extends across the panel 20 into both chambers 16, 18. For example, the diffuser 22 may extend through a bottom portion (as shown in FIGS. 4-7A and 8A-8C) or a top portion of the panel 20. The diffuser 22 may be any suitable material, for example, the same type of material as the airbag 14.

The diffuser 22 may include an inboard vent 52 in fluid communication with the inboard chamber 16 and an outboard vent 54 in fluid communication with the outboard chamber 18. The inboard vent 52 may be disposed on one end of the diffuser 22 and the outboard vent 54 on another end of the diffuser 22. The inboard vent 52 and the outboard vent 54 allow inflation gas to flow out of the diffuser 22 and into the respective chambers 16, 18. The vents 52, 54 may be, for example, open vents, one-way vents, two-way vents, or active vents. In one example, the vents 52, 54 may be sized proportional to the size (e.g., volume) of the respective chambers 16, 18 to allow for equal inflation of the chambers. For example, in the Figures, the outboard chamber 18 is larger in volume than the inboard chamber 16. Accordingly, the outboard vent 54 is sized proportionally larger than the inboard vent 52 to allow the chambers 16, 18 to inflate equally (e.g., to a common pressure).

The airbag 14 includes the releasable vent 24 between the diffuser 22 and one of the inboard chamber 16 and the outboard chamber 18. The releasable vent 24 may be sized to allow additional inflation gas to flow out of the diffuser 22 and into one of the inboard chamber 16 and the outboard chamber 18. The releasable vent 24 may be, for example, a one-way vent, two-way vent, etc. Size of the releasable vent 24 may be adjustable, for example, based on a desired stiffness (e.g., pressure) of the inboard chamber 16 and the outboard chamber 18. For example, size of the releasable vent 24 may be increased if a stiffer (e.g., greater pressure) chamber 16, 18 is desired or vice versa.

In the example in FIGS. 4 and 5, the releasable vent 24 is positioned between the diffuser 22 and the inboard chamber 16. In another example, the releasable vent 24 may be positioned between the diffuser 22 and the outboard chamber 18 (not shown).

Figure 6:
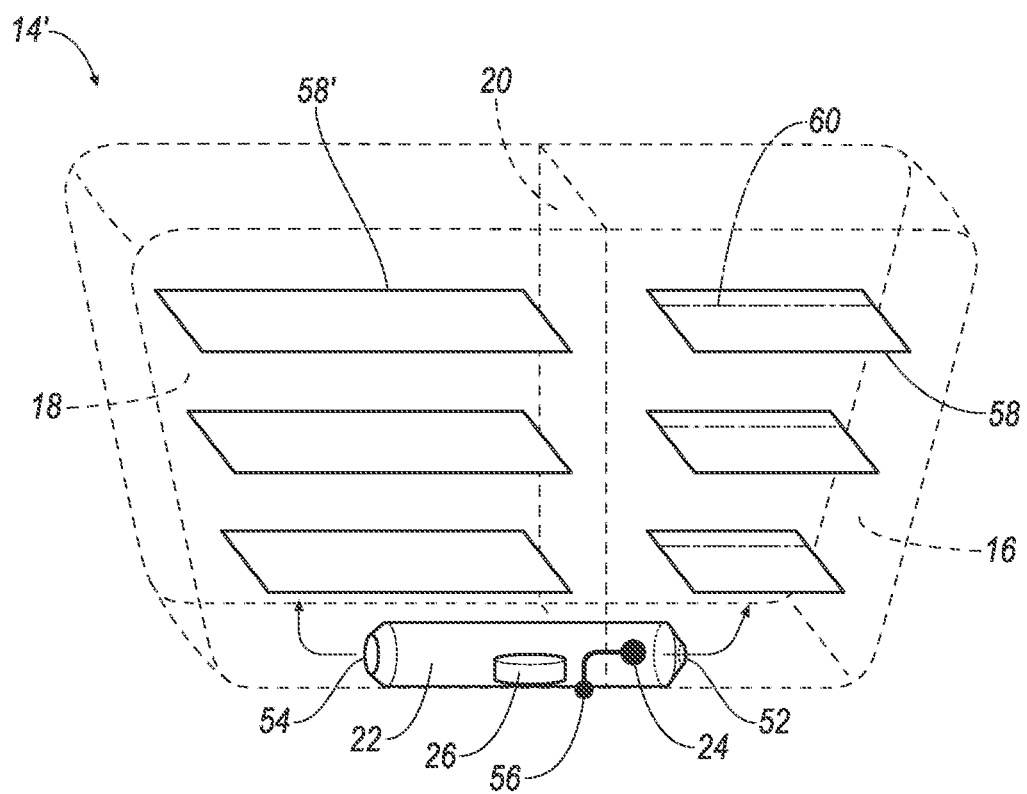
FIG. 6 is a perspective view of another example of the airbag.

In the examples shown in FIGS. 4-6, the releasable vent 24 is spaced from the inboard vent 52 and the outboard vent 54. For example, the releasable vent 24 may be positioned at a predetermined distance (e.g., greater than 0) away from the inboard vent 52 and the outboard vent 54. Position of the releasable vent 24 may be adjustable, for example, based on a desired stiffness (e.g., pressure) of the inboard chamber 16 and the outboard chamber 18.

Figure 7A:
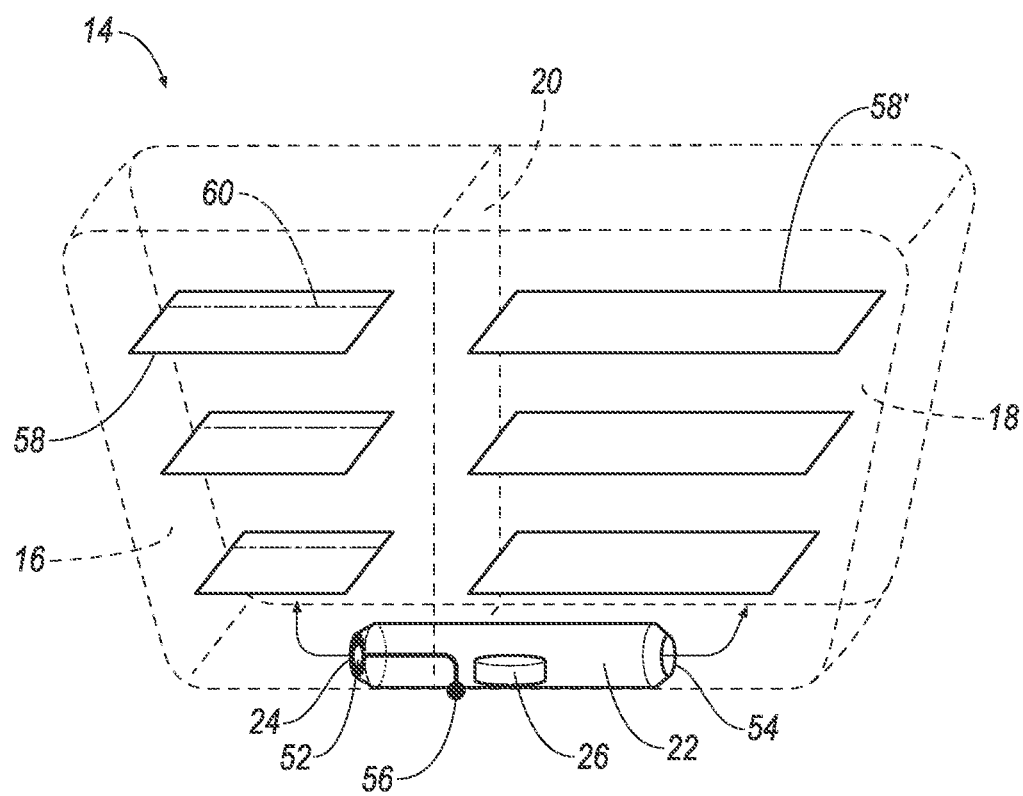
FIG. 7A is a perspective view of yet another example of the airbag.

In another example of the releasable vent 24 shown in FIG. 7A, the releasable vent 24 may be at the inboard vent 52 or the outboard vent 54 (for example, shown on the inboard vent 52 in FIG. 7A). In such examples, the releasable vent 24 is designed to expand a cross-sectional area of one of the inboard vent 52 and the outboard vent 54 (i.e., the inboard vent 52 in FIG. 7A). The releasable vent 24 may be directly connected to one of the inboard vent 52 and the outboard vent 54, i.e., without any intervening components therebetween. The releasable vent 24 may be sized greater than the inboard vent 52 and/or the outboard vent 54. When the releasable vent 24 is released, a cross-sectional area of one of the inboard vent 52 and outboard vent 54 is expanded (i.e., increased).

Figure 7B:
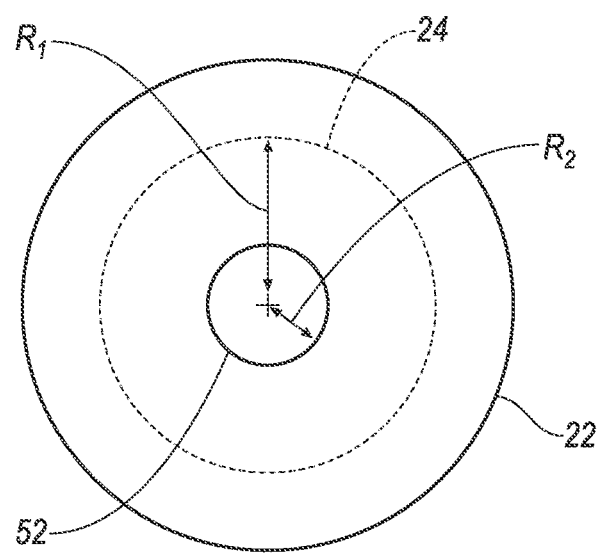
FIG. 7B is a side view of an inboard vent from FIG. 7A.

In the example shown in FIG. 7B, the releasable vent 24 is directly connected to the inboard vent 52. The releasable vent 24 has a radius R1 and the inboard vent 52 has a radius R2, where radius R1 is greater than radius R2. When the releasable vent 24 is released, the radius R2 of the inboard vent 52 may be increased to the radius R1; thus, expanding (i.e., increasing) the cross-sectional area of the inboard vent 52.

The airbag 14 may include a pyrotechnic release 56 connected to the releasable vent 24. The pyrotechnic release 56 may release the releasable vent 24. For example, the pyrotechnic release 56 may be actuated, for example, by an igniter that causes the pyrotechnic release 56 to detach from the releasable vent 24.

With reference to FIG. 4, the inboard vent 52 and the outboard vent 54 are sized to inflate the inboard chamber 16 and the outboard chamber 18 to the same pressure when the releasable vent 24 is not released. For example, in a full-frontal impact, the releasable vent 24 remains closed, e.g., the pyrotechnic release 56 is not actuated. In such an example, the inflation gas supplied by the inflator 26 flows into the inboard chamber 16 and the outboard chamber 18 through the respective inboard vent 52 and outboard vent 54. The inboard chamber 16 and the outboard chamber 18 are inflated to the same pressure.

With reference to FIG. 5, the inboard vent 52, the outboard vent 54, and the releasable vent 24 are sized to inflate the inboard chamber 16 and the outboard chamber 18 to different pressures when the releasable vent 24 is actuated. For example, in an angular impact (e.g., oblique impact), the pyrotechnic release 56 is actuated and causes the releasable vent 24 to open. In such an example, the inflation gas supplied by the inflator 26 flows into the inboard chamber 16 and the outboard chamber 18 through the respective inboard vent 52 and outboard vent 54 and the releasable vent 24 allows additional inflation gas into one of the inboard chamber 16 and the outboard chamber 18.

In one example, the inboard vent 52, the outboard vent 54, and the releasable vent 24 are sized to inflate the inboard chamber 16 to a greater pressure than the outboard chamber 18 (as shown in FIG. 5). The inflation gas supplied by the inflator 26 flows into the inboard chamber 16 through the inboard vent 52 and the releasable vent 24, and into the outboard chamber 18 through the outboard vent 54.

In another example, the inboard vent 52, the outboard vent 54, and the releasable vent 24 are sized to inflate the outboard chamber 18 to a greater pressure than the inboard chamber 16 (not shown). The inflation gas supplied by the inflator 26 flows into the outboard chamber 18 through the outboard vent 54 and the releasable vent 24, and into the inboard chamber 16 through the inboard vent 52.

With reference to FIGS. 4 and 5, the airbag 14 may include releasable tethers 58, 58' connected to the rear surface 46 and the front surface 48 of the airbag 14. For example, the releasable tether 58 may be connected to the rear surface 46 and the front surface 48 of the inboard chamber 16. The releasable tether 58' may be connected to the rear surface 46 and the front surface 48 of the outboard chamber 18. The releasable tethers 58, 58' may be connected using, for example, stitching, adhesive, friction welding, etc. The releasable tethers 58, 58' may be formed of any suitable material, for example, the same material as the airbag 14. The releasable tethers 58, 58' may have a strap-like or cord-like shape. The releasable tethers 58, 58' form and alter the shape of the respective chambers 16, 18 when inflated (e.g., is in the inflated position).

The releasable tether 58 may include tack stitching 60 and the tack stitching 60 may be designed to rupture, i.e., to break away. For example, the tack stitching 60 may tear, rip, burst, etc. The tack stitching 60 may rupture when pressure inside the inboard chamber 16 is greater than a predetermined pressure threshold. The tack stitching 60 may rupture, for example, when additional inflation gas flows into one of the inboard chamber 16 and the outboard chamber 18 via the releasable vent 24. For example, when the releasable vent 24 is open, inflation gas flows into the inboard chamber 16 via the inboard vent 52 and the releasable vent 24. The additional inflation gas increases the pressure of the inboard chamber 16 to above the predetermined pressure threshold and causes the tack stitching 60 to rupture. As the tack stitching 60 ruptures, the releasable tether 58 stretches from a first width W1 (shown in FIG. 4) to a second width W2 (shown in FIG. 5) and expands (i.e., increases) a volume of the inboard chamber 16. In some examples, the releasable tether 58' does not include tack stitching 60 and the releasable tether 58' has a fixed width, e.g., third width W3 (shown in FIGS. 4 and 5). In other examples, the releasable tether 58' may include tack stitching 60.

In yet other examples, the inboard chamber 16 may be allowed to expand using a plurality of tethers, each tether having a different width. For example, when the chambers 16, 18 are inflated equally, a first tether having a first width may be released. When one chamber is to be inflated to a greater pressure than the other chamber, a second tether having a second width may be released, where the second width is greater than the first width. In another example, the releasable tether 58 may be accordion-like having various widths. The inboard chamber 16 may be expanded to the various widths of the releasable tether 58.

With reference to FIG. 6, an airbag 14' is a reflection of the airbag 14 over a vehicle-upward direction. In other words, the airbag 14' mirrors the airbag 14. In at least one example, the airbag 14' may be identical to the airbag 14, except that the airbag 14' in the inflated position is disposed in front of the seat bottom 34 of the front driver seat 30; therefore, it will not be re-explained here. The airbag 14' may be positioned to contact knees of an occupant, e.g., a $5^{th}$ percentile to $95^{th}$ percentile occupant, of the front driver seat 30 when the airbag 14' is inflated.

The airbag 14 includes the inflator 26 in fluid communication with the diffuser 22. For example, the inflator 26 may be housed inside the diffuser 22 or the inflator 26 may be coupled to the diffuser 22. The inflator 26 may supply inflation gas to inflate the chambers 16, 18. The inflator 26 may be, for example, a pyrotechnic inflator that uses a chemical reaction to supply inflation gas to the chambers 16, 18. The inflator 26 may be of any suitable type, for example, cold-gas inflator. In one example, the inflator 26 may be positioned in the center of the diffuser 22, so that the chambers 16, 18 may receive inflation gas at the same time. In another example, the inflator 26 may be positioned off-center to the diffuser 22, so that one chamber may receive inflation gas before the other chamber.

Figure 8A:
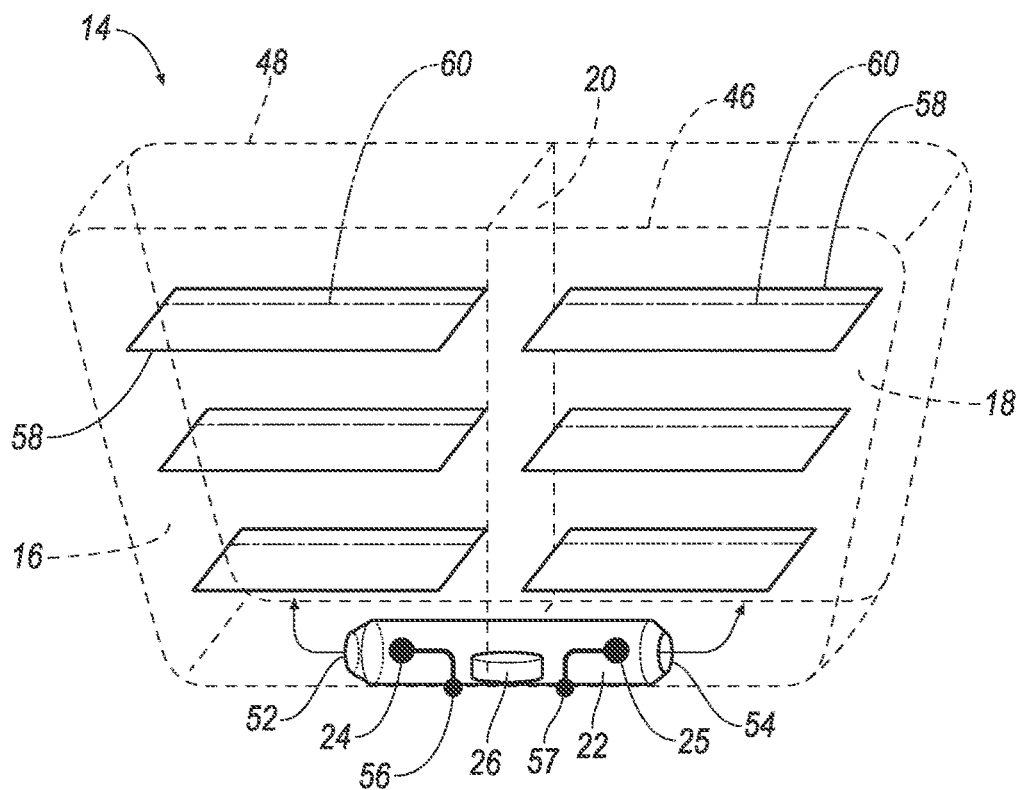
FIG. 8A is a perspective view of yet another example of the airbag.
Figure 8B:
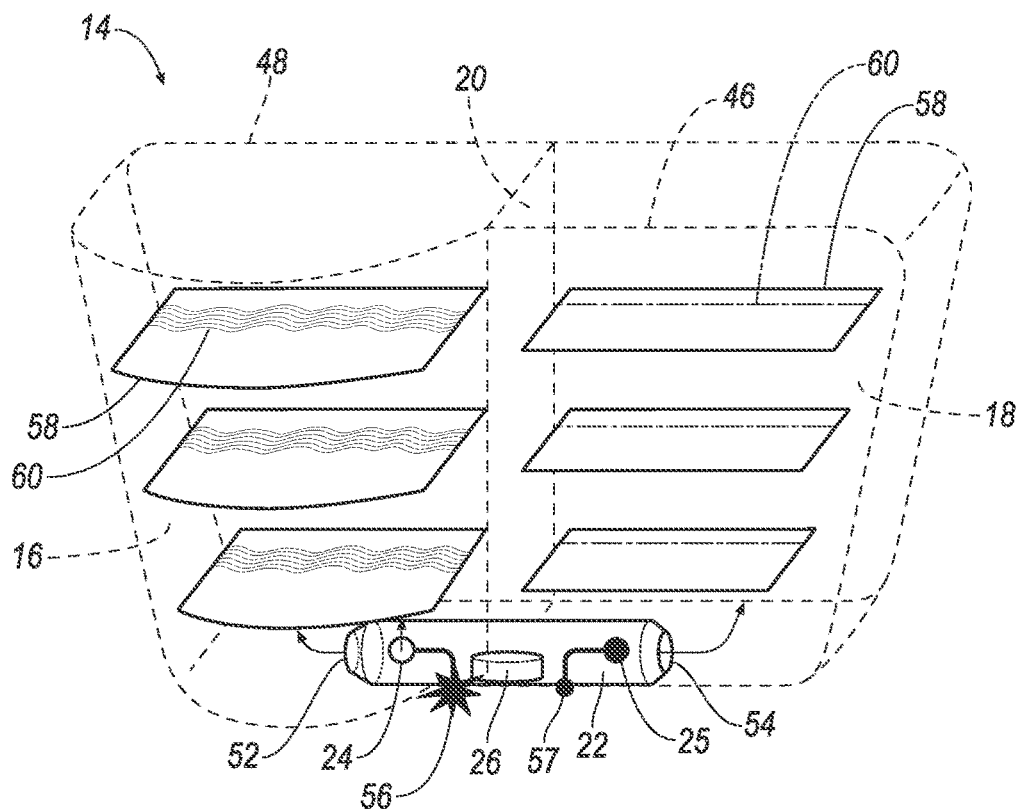
FIG. 8B is a perspective view of the example airbag in FIG. 8A where an inboard chamber is inflated to a greater pressure than an outboard chamber.
Figure 8C:
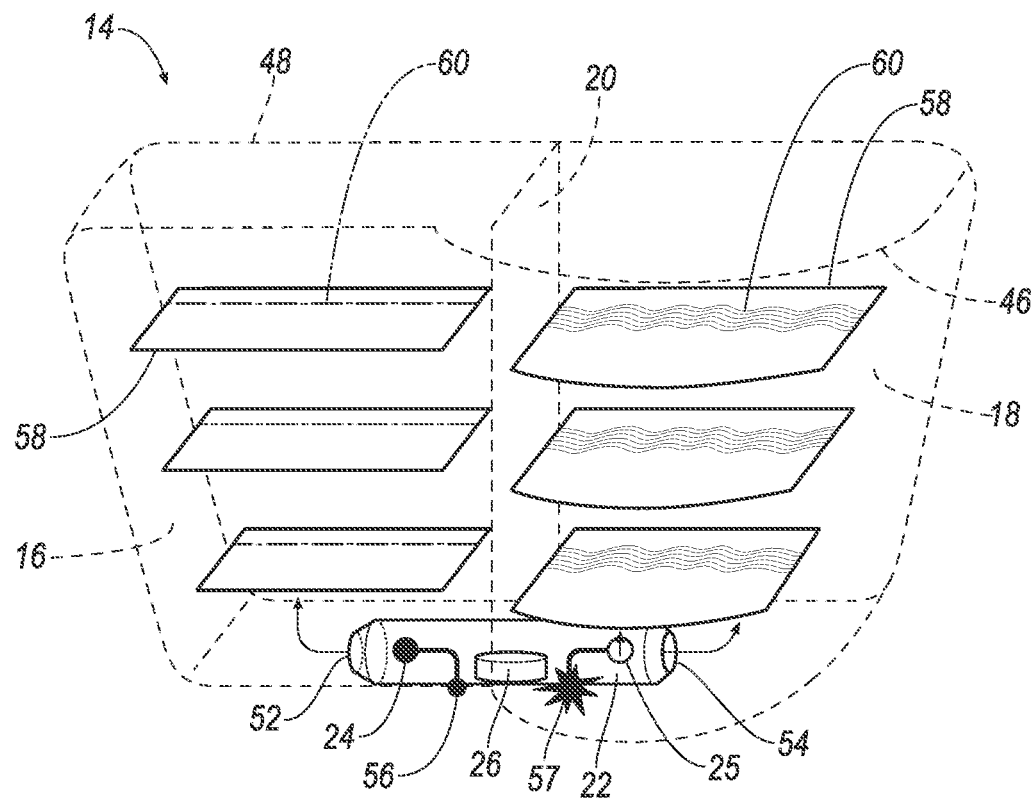
FIG. 8C is a perspective view of the example airbag in FIG. 8A where the outboard chamber is inflated to a greater pressure than the inboard chamber.

With reference to FIGS. 8A-8C, the airbag 14 may include a second releasable vent 25 between the diffuser 22 and the outboard chamber 18. In at least one example, the second releasable vent 25 may be identical to the releasable vent 24, except that the second releasable vent 25 may be between the diffuser 22 and the outboard chamber 18 (rather than between the diffuser 22 and the inboard chamber 16); therefore, it will not be re-explained here. The second releasable vent 25 may be sized to allow additional inflation gas to flow out of the diffuser 22 and into the outboard chamber 18 (as shown in FIG. 8C). In the example in FIGS. 8A-8C, the inboard vent 52 and the outboard vent 54 may be sized equally (i.e., the same) to allow the chambers 16, 18 to inflate equally (e.g., to a common pressure) when the releasable vent 24 and the second releasable vent 25 are not actuated.

The airbag 14 may include a second pyrotechnic release 57 connected to the second releasable vent 25. The second pyrotechnic release 57 may release the second releasable vent 25. For example, the second pyrotechnic release 57 may be actuated, for example, by an igniter that causes the second pyrotechnic release 57 to detach from the second releasable vent 25.

With reference to FIG. 8A, the inboard vent 52 and the outboard vent 54 are sized to inflate the inboard chamber 16 and the outboard chamber 18 to the same pressure when the releasable vent 24 and the second releasable vent 25 are not released. For example, in a full-frontal impact, the releasable vent 24 and the second releasable vent 25 remain closed, e.g., the pyrotechnic release 56 and the second pyrotechnic release 57 are not actuated. In such an example, the inflation gas supplied by the inflator 26 flows into the inboard chamber 16 and the outboard chamber 18 through the respective inboard vent 52 and outboard vent 54. The inboard chamber 16 and the outboard chamber 18 are inflated to the same pressure.

With reference to FIGS. 8B and 8C, the releasable vent 24 or the second releasable vent 25 may be released to selectively inflate the inboard chamber 16 or the outboard chamber 18, respectively, to a relatively higher pressure. With reference to FIG. 8B, the inboard vent 52, the outboard vent 54, the releasable vent 24, and the second releasable vent 25 are sized to inflate the inboard chamber 16 and the outboard chamber 18 to different pressures when the releasable vent 24 or the second releasable vent 25 is actuated. For example, in a left angular impact (e.g., left oblique impact), the pyrotechnic release 56 is actuated and causes the releasable vent 24 to open. In such an example, the inflation gas supplied by the inflator 26 flows into the inboard chamber 16 and the outboard chamber 18 through the respective inboard vent 52 and outboard vent 54 and the releasable vent 24 allows additional inflation gas into the inboard chamber 16.

With reference to FIG. 8C, the inboard vent 52, the outboard vent 54, the releasable vent 24, and the second releasable vent 25 are sized to inflate the inboard chamber 16 and the outboard chamber 18 to different pressures when the second releasable vent 25 is actuated. For example, in a right angular impact (e.g., right oblique impact), the second pyrotechnic release 57 is actuated and causes the second releasable vent 25 to open. In such an example, the inflation gas supplied by the inflator 26 flows into the inboard chamber 16 and the outboard chamber 18 through the respective inboard vent 52 and outboard vent 54 and the second releasable vent 25 allows additional inflation gas into the outboard chamber 18.

Figure 9:
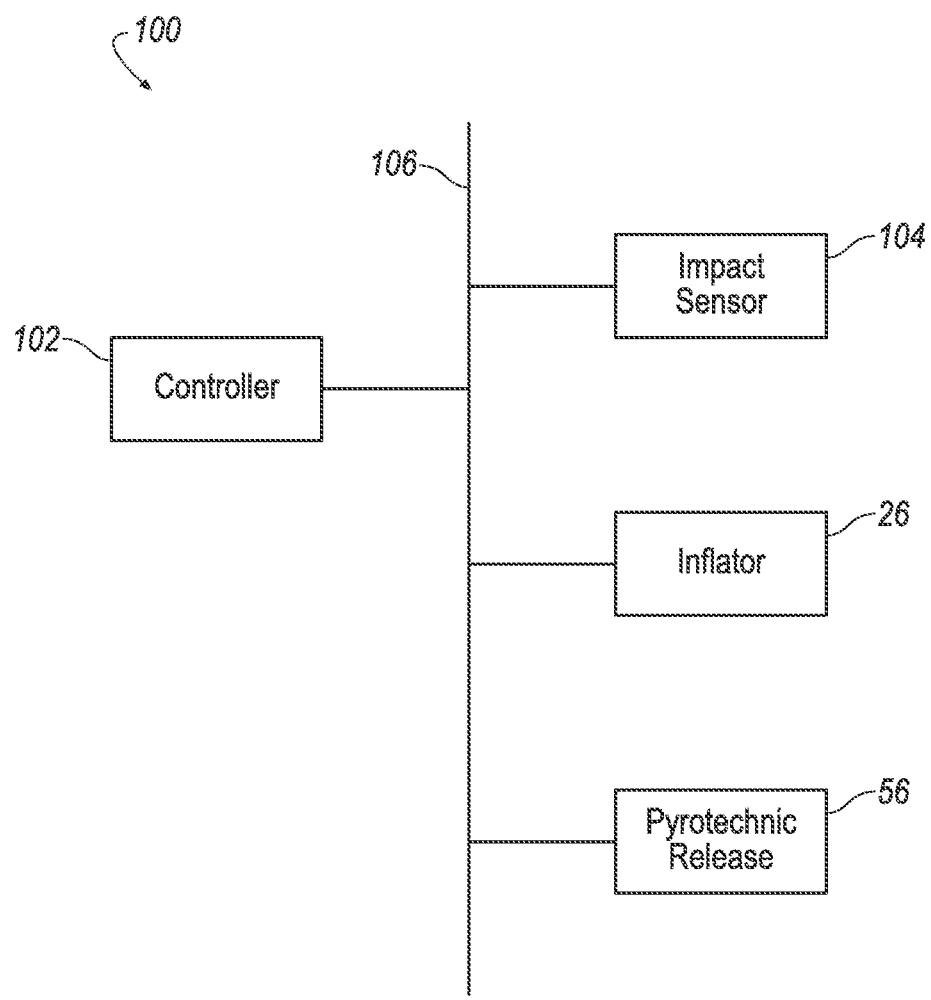
FIG. 9 is a block diagram of a control system for the airbag.

With reference to FIG. 9, a control system 100 may include a controller 102, the inflator 26, the pyrotechnic release 56, and an impact sensor 104. The control system 100 may transmit signals through a communications network 106, such as a controller area network (CAN) bus, Ethernet, Wi-Fi, local interconnect network (LIN), and/or by any other wired or wireless communications network. The controller 102 may be in communication with the inflator 26, the pyrotechnic release 56, and the impact sensor 104 via the communications network 106.

The impact sensor 104 is adapted to detect an impact to the vehicle 12. The impact sensor 104 may be of any suitable type, for example, post-contact sensors such as linear or angular accelerometers, gyroscopes, pressure sensors, and contact switches; and pre-impact sensors such as radar, lidar, and vision-sensing systems. The vision-sensing systems may include one or more cameras, charge-coupled device (CCD) image sensors, complimentary metal-oxide-semiconductor (CMOS) image sensors, etc. The impact sensor 104 may be located at numerous points in or on the vehicle 12.

The controller 102 may be a microprocessor-based controller. The controller 102 may include a processor, memory, etc. The memory of the controller 102 may include memory for storing instructions executable by the processor as well as for electronically storing data and/or databases. The controller 102 may be a restraint control module and may control the airbag 14, seatbelts, etc., of the vehicle 12.

The controller 102 may be programmed to actuate the pyrotechnic release 56 in response to an angular impact. The controller 102 receives a signal through the communications network 106 from the impact sensor 104 indicating that the vehicle 12 has experienced or is about to experience an impact. The controller 102 determines whether the impact is a full-frontal impact or an angular impact. If the impact is a full-frontal impact, the controller 102 activates the inflator 26. For example, the controller 102 transmits instructions via the communications network 106 to inflator 26 to inflate the inboard chamber 16 and the outboard chamber 18 equally (e.g., same pressure).

If the impact is an angular impact, the controller 102 actuates the pyrotechnic release 56. For example, the controller 102 can ignite an igniter and cause the pyrotechnic release 56 to detach from the releasable vent 24. Next, the controller 102 activates the inflator 26. For example, the controller 102 transmits instructions via the communications network 106 to inflator 26 to supply inflation gas to the inboard chamber 16 and the outboard chamber 18. Inflation gas will flow from the diffuser 22 and into the inboard chamber 16 via the inboard vent 52 and the releasable vent 24. Inflation gas will also flow from the diffuser 22 and into the outboard chamber 18 via the outboard vent 54. The inboard chamber 16 will be inflated to a greater pressure and/or a greater volume than the outboard chamber 18.

Computing devices, such as the controller 102 generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An instrument panel assembly, comprising:
an instrument panel;
an airbag supported by the instrument panel and having an inboard chamber and an outboard chamber;
a panel separating the inboard chamber and the outboard chamber;
a diffuser in fluid communication with both the inboard chamber and the outboard chamber, the diffuser extending through the panel;
a releasable vent between the diffuser and one of the inboard chamber and the outboard chamber; and
an inflator in fluid communication with the diffuser.

2. The instrument panel assembly of claim 1, wherein the panel separates the inboard chamber and the outboard chamber horizontally.

3. The instrument panel assembly of claim 1, wherein the panel fluidly separates the inboard chamber and the outboard chamber.

4. The instrument panel assembly of claim 1, wherein the panel is permeable.

5. An airbag assembly, comprising:
an airbag having an inboard chamber and an outboard chamber;
a panel separating the inboard chamber and the outboard chamber;
a diffuser in fluid communication with both the inboard chamber and the outboard chamber;
a releasable vent between the diffuser and one of the inboard chamber and the outboard chamber; and
an inflator in fluid communication with the diffuser;
the diffuser including an inboard vent in fluid communication with the inboard chamber, an outboard vent in fluid communication with the outboard chamber, and the releasable vent being designed to expand a cross-sectional area of one of the inboard vent and the outboard vent.

6. The airbag assembly of claim 5, wherein the diffuser extends through the panel.

7. The airbag assembly of claim 5, wherein the panel separates the inboard chamber and the outboard chamber horizontally.

8. The airbag assembly of claim 5, wherein the panel fluidly separates the inboard chamber and the outboard chamber.

9. The airbag assembly of claim 5, wherein the panel is permeable.

10. The airbag assembly of claim 5, further comprising a one-way valve on the panel and in fluid communication with the inboard chamber and the outboard chamber.

11. The airbag assembly of claim 5, further comprising a pyrotechnic release connected to the releasable vent.

12. The airbag assembly of claim 11, further comprising a controller programmed to actuate the pyrotechnic release in response to an angular impact.

13. The airbag assembly of claim 5, wherein the releasable vent is spaced from the inboard vent and the outboard vent.

14. The airbag assembly of claim 5, wherein the inboard vent, the outboard vent, and the releasable vent are sized to inflate the inboard chamber and the outboard chamber to same pressure.

15. The airbag assembly of claim 5, wherein the inboard vent, the outboard vent, and the releasable vent are sized to inflate the inboard chamber and the outboard chamber to different pressures.

16. The airbag assembly of claim 5, wherein the releasable vent is in communication with the inboard chamber, and the inboard vent, the outboard vent, and the releasable vent are sized to inflate the inboard chamber to a greater pressure than the outboard chamber.

17. The airbag assembly of claim 5, further comprising a releasable tether connected to a front surface and a rear surface of the airbag.

18. The airbag assembly of claim 17, wherein the releasable tether includes tack stitching, and the tack stitching is designed to rupture.

19. An airbag assembly, comprising:
an airbag having an inboard chamber and an outboard chamber;
a panel separating the inboard chamber and the outboard chamber;
a diffuser in fluid communication with both the inboard chamber and the outboard chamber;
a releasable vent between the diffuser and one of the inboard chamber and the outboard chamber;
an inflator in fluid communication with the diffuser; and
a pyrotechnic release connected to the releasable vent.

20. The airbag assembly of claim 19, further comprising a controller programmed to actuate the pyrotechnic release in response to an angular impact.

* * * * *